United States Patent Office 3,159,490
Patented Dec. 1, 1964

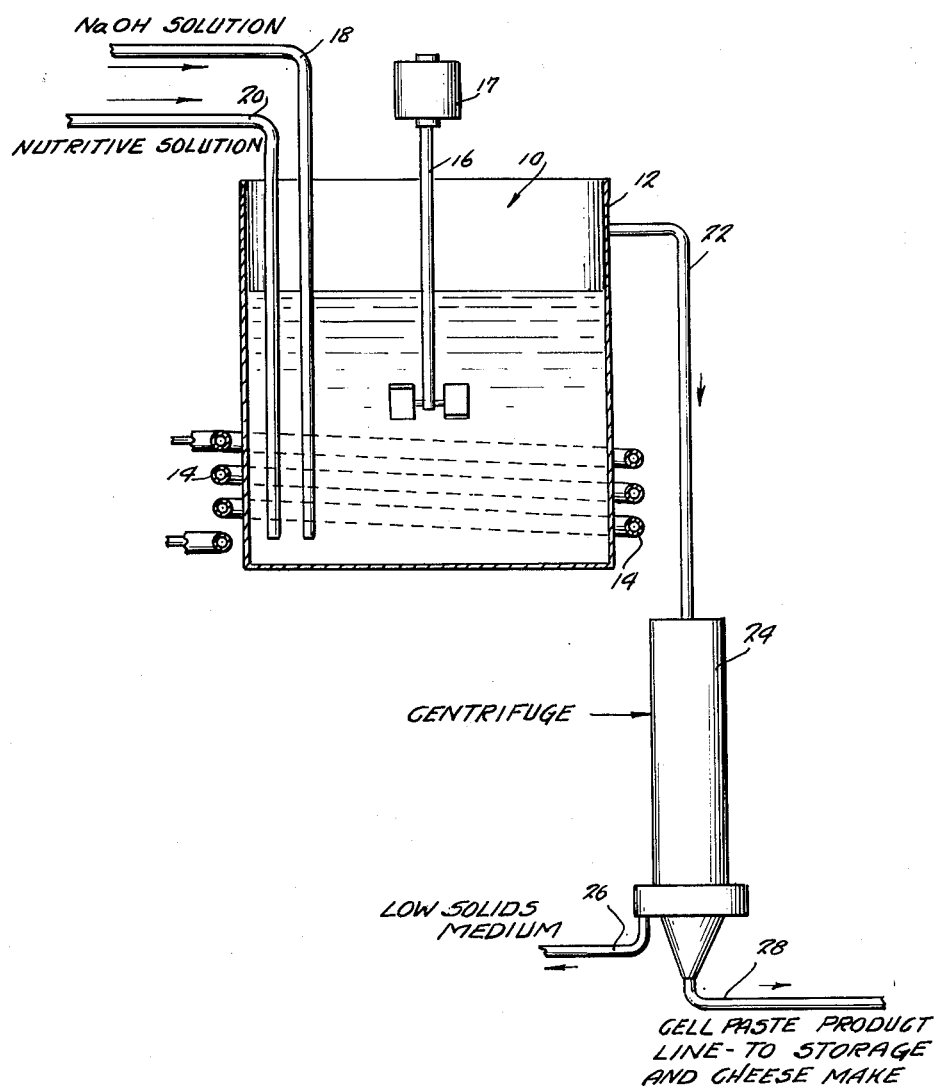

3,159,490
MANUFACTURING SWISS CHEESE USING
PROPIONIBACTERIUM SHERMANII
Ralph V. Hussong, Deerfield, and Myro Purko, Evanston, Ill., assignors to National Dairy Products Corporation, New York, N.Y., a corporation of Delaware
Filed Nov. 20, 1962, Ser. No. 239,017
1 Claim. (Cl. 99—116)

The present invention generally relates to cheesemaking and more particularly it relates to a method of preparation of an improved bacterial cell paste for cheesemaking and to a method of cheesemaking, incorporating such cell paste.

In certain cheesemaking processes a bacterial starter is utilized in order to develop acid in the milk so as to coagulate the milk, and/or to develop the characteristic flavor and taste in the cheese during its manufacture. In the manufacture of Swiss or Emmenthaler cheese, the starter is selected to develop carbon dioxide gas in the course of manufacture in order to provide the holes which are characteristic of this type of cheese.

The bacterial culture or starter which is added to the milk during cheesemaking usually has a relatively dilute concentration of bacterial cells therein and may contain considerable quantities of the substrate or medium in which the bacteria are cultured. Difficulties have been encountered in storing the bacterial culture so as to leave it in a viable condition until use. Not only the bacteria but the substrate may deteriorate. Moreover, the cultured media are bulky and so are difficult to transport and/or store. Accordingly, it has been the practice in cheesemaking to culture the bacteria at, or adjacent the cheesemaking plant site, rather than ship the bulky starter to the plant site from a central location.

The procedure for preparation of bacterial cultures for use in cheesemaking involves the growth of the bacteria in a suitable medium, usually skim milk, and then addition of the total culture-containing medium to the milk to be used for the cheese.

Now, however, there has been discovered an improved procedure for the culturing of bacteria for use in cheesemaking, and an improved method for incorporating the bacteria in milk used for cheesemaking. The improved culturing procedure can be satisfactorily carried out on either a batch or a continuous basis, but preferably the latter, and the bacteria are provided substantially separated from the substrate, that is, in highly concentrated form, so that they are capable of being conveniently stored for extended periods, and they can be handled at low cost.

Accordingly, it is the principal object of the present invention to provide an improved bacterial preparation for cheesemaking. It is also an object of the present invention to provide an improved method of propagating and concentrating bacteria for use in cheesemaking. It is a further object of the present invention to provide improvement in a cheesemaking method which improvement includes the use of the bacterial preparation of this invention.

Further objects and advantages of the present invention will be apparent from a study of the following detailed description and of the accompanying drawings of which:

The single figure is a schematic flow diagram illustrating a preferred embodiment of a method of preparing a bacterial concentrate, in accordance with the present invention.

The present invention includes a method whereby bacteria suitable for cheesemaking can be prepared in concentrated form and on a small or large scale, batchwise or continuously. The present invention also includes an improved method of cheesemaking, wherein such bacteria so prepared are utilized.

Now referring more particularly to the accompanying drawing, the single figure is a schematic flow diagram illustrating a preferred embodiment of the method of preparing a bacterial concentrate according to the present invention. In the figure, a chamber 10 is shown which may comprise an open-topped glass or glass-lined vessel 12 or the like, the contents of which may be heated by heating coils 14. The vessel is provided with agitating means 16. The agitating means 16 may comprise a mechanically operated stirring rod or the like, connected to a motor 17.

Vessel 12 is provided with two inlet lines. One inlet line 18 admits a pH-adjusting solution to the vessel, as for example, aqueous sodium hydroxide solution. The other inlet line 20 furnishes a nutritive solution (bacterial growth medium) to the vessel. Lines 18 and 20 preferably terminate adjacent the bottom of the vessel and at a point distant from an overflow outlet line 22 provided in the sidewall of the vessel. The overflow line 22 is connected to a continuous centrifuge 24 which may be of any suitable design capable of separating solids from liquids and continuously passing the separated products therefrom through separate lines. In this connection, an exit line 26 is provided adjacent the bottom of the continuous centrifuge for continuously passing out therefrom low solids medium. A separate exit line 28 is also provided from the centrifuge through which line the desired product in the form of a cell paste is passed to further treatment, to storage or to a cheesemaking vat. Alternatively, a semi-continuous centrifuge may be utilized, wherein the desired product is retained until the centrifuge is stopped, whereupon the cell paste is removed.

The system schematically shown in the accompanying figure is adapted to provide a bacterial cell paste product as a result of continuous generation of bacteria in the vessel. A nutritive bacterial culture solution can be continuously passed into the vessel, and so also can the pH-adjusting solution, and a portion of bacteria-containing nutritive solution can be continuously passed from the vessel to the centrifuge for separation into a low solids medium and desired bacterial cell paste.

The system is particularly adapted for the preparation of a cell paste consisting essentially of *Propionibacterium shermanii* or similar propionic acid-producing bacteria for use in Swiss cheese manufacture. It will also be understood that the same system could be used in the production of *Streptococcus lactic* bacteria, or other various bacterial cultures used in the manufacture of cultured dairy products.

The following is an example of the production of *Propionibacterium shermanii* cell paste on a batch basis by the present method:

EXAMPLE I

A nutritive bacterial growth medium which includes the constituents set forth in Table I below was prepared:

*Table I*

| Constituents: | Weight |
|---|---|
| Soy peptone | g-- 45 |
| Extractables from brewers yeast | g-- 60 |
| Enzyme hydrolyzed milk protein | g-- 75 |
| A salt solution [1] | ml-- 300 |
| B salt solution [2] | ml-- 300 |
| C salt solution [3] | ml-- 300 |
| Water—Sufficient to make up to 14 liters. | |

[1] Comprising 50 grams of sodium chloride, 25 grams $KH_2PO_4$, and 50 grams $(NH_4)_2HPO_4$ per 500 ml. water.
[2] Comprising 5 grams $MgSO_4 \cdot 7H_2O$, 0.95 gram $MnSO_4 \cdot H_2O$, and 0.25 gram $FeSO_4 \cdot 7H_2O$, per 500 ml. water.
[3] Comprising 50 grams of tripotassium citrate and 125 grams of sodium acetate per 500 ml. water.

The pH of the solution set forth in the Table I was adjusted to about 6.7 with aqueous sodium hydroxide solution, and then the solution was autoclaved for one hour at 250 degrees F.

To the solution prepared in accordance with Table I, there was added 1 liter of water containing 150 grams of lactose, thereby providing a bacterial growth medium. The lactose solution was autoclaved for 15 minutes at 250 degrees F., before addition to the solution set forth in Table I.

The prepared bacterial growth medium was placed in the vessel 12 and was then inoculated with a culture of *Propionibacterium shermanii* at a level of 200 ml. of culture per 15 liters of growth medium. The growth medium containing the bacterial culture was then held at 86 degrees F. in the vessel for 48 hours, with the pH being adjusted at least every 12 hours with aqueous sodium hydroxide solution through line 18 to maintain it within the range of 6.7 to 7.0. Once the optimal bacterial concentration was obtained in the initially introduced inoculated growth medium, that is, at the end of the 48 hour period, the entire batch of bacteria-containing growth medium was then passed to the centrifuge to separate out the propionic acid-generating bacteria therein in the form of a cell paste.

EXAMPLE II

The system, as described in Example I, was put on a continuous basis utilizing the same constituents. Thus, the initial 48 hour growth period, as called for in Example I, was used and aqueous sodium hydroxide was then continuously run into the vessel 12 to maintain the *Propionibacterium shermanii* at a pH of 6.7 to 7.0, and nutritive bacterial growth medium was continuously fed to the vessel. An equal amount of bacteria-laden growth medium was continuously passed from the vessel through the outlet line 22 to the centrifuge 24 wherein the finished cell paste was obtained by separation from the growth medium.

The volume of growth medium in the vessel 12 and the rate of overflow of bacteria-containing growth medium from that chamber were controlled so that maximum development of bacteria was assured. For example, with *Propionibacterium shermanii*, the average residence time for bacteria within the growth chamber in the continuous treatment was from about 20 to about 30 minutes. Since the bacteria were maintained at optimal concentrations and under optimal growth conditions throughout the residence time in the growth chamber, there was optimal continued growth of the bacteria therein so that relatively large yields of bacteria per unit of time were obtained.

The described continuous process yielded from about 15 to about 18 grams of *Propionibacterium shermanii* cell paste per liter of growth medium, the cell paste having a moisture content of about 80 percent by weight and a bacterial population of the order of about $10^{10}$ per gram, which is 50 to 150 times as great as the bacterial population in a conventional bacterial starter. This cell paste was substantially the same as produced in accordance with Example I.

The cell paste was then stored, in the as-produced condition, at about 35 degrees F., for up to 4 months without losing appreciable viability. It was found that the paste could also be stored at room temperature (70 degrees F.), and would retain adequate viability for a week or more.

The cell paste could be further concentrated by lyophilizing (freeze drying), resulting in a product of enhanced storage stability.

In the case of *Streptococcus lactis* bacteria, it has been found that one hundred liters of the nutritive growth medium will yield, under conditions of continuous operation in the described process and utilizing a residence time of about 20 to 30 minutes, a total of about 400 grams of bacterial cell paste having about 100 times greater bacterial population than a conventional *Streptococcus lactis*, starter culture. The per gram bacterial population can be further increased, for example 1000–10,000 fold by lyophilization of the paste.

With the described system it is possible to provide on a commercial scale a cell paste production center and to economically ship the cell paste to particular points of use in cheesemaking. Due to low bulk and good storage stability of the cell paste, it is no longer necessary to provide culturing facilities at each cheese factory. It will be understood that this is a substantial commercial advantage and reduces the over-all cost of cheesemaking.

EXAMPLE III

Now, referring to an improved Swiss cheesemaking method, propionic acid-generating bacteria cell paste is produced, as previously described, and is incorporated into milk before setting of the milk in place of the usual bacterial culture. The remaining steps of the Swiss cheese make are then carried out in the conventional manner.

In this connection, two grams of *Propionibacterium shermanii* cell paste is added to approximately 200 milliliters of milk, and is blended therewith in a high-speed blender. The resultant blend, comprising two grams of cell paste in suspension is then added to 10,000 pounds of whole milk contained in a conventional Swiss cheese vat.

Following the addition of the foregoing blend to the milk, the normal methods of Swiss cheese manufacture and cure are employed.

The resultant Swiss cheese is a high-quality product, which is superior in various respects to Swiss cheese heretofore known.

The Swiss cheese produced in accordance with the present invention utilizing the cell paste of the present invention is of uniformly high grade, color, texture, pH, moisture, appearance, and taste and in all respects the cell paste performs in a satisfactory manner, for example, as a propionic acid-developing agent or in the case of *Streptococcus lactis*, as a lactic acid-developing agent.

Example IV below illustrates various features of the present invention with respect to the preparation and use of *Streptococcus lactis* cell paste:

EXAMPLE IV

A total of 15 liters of the bacterial growth medium set forth in Example I was introduced into a glass lined vessel and inoculated with a culture of *Streptococcus lactis* at a level of 200 ml. of culture per 15 liters of growth medium. The bacteria were uniformly distributed throughout the growth medium by means of a mechanical stirring rod and the medium was then held in the vessel at 86° F., for about 24 hours, the pH of the medium being adjusted intermittently to maintain it within the range of 6.8 to 7.0. At the end of the 24 hour period, fresh growth medium of the described type was then run continuously into the growth chamber, together with a sufficient amount of aqueous sodium hydroxide solution to maintain the pH within the range of 6.8 to 7.0. The mechanical stirrer was operated continuously to uniformly distribute the hydroxide solution and the fresh medium throughout the bacteria-containing medium. The resultant mixture continuously overflowed into an outlet line and was removed from the growth chamber and continuously passed to a centrifuge operating at about 30,000 r.p.m. wherein the bacteria-containing growth medium was separated from the cell paste by centrifugal action. The average residence time of the bacteria within the vessel, beyond the initial growth period, was about 20 minutes. About 100 liters of the growth medium yielded about 400 grams of the cell paste, having a bacterial population about 100 times greater than the bacterial population in a conventional *S. lactis* starter culture.

The cell paste was used in the production of Cheddar cheese by adding it to the milk during the cheese make in a concentration of about 0.15 pound per 10,000 pounds of milk, after which the usual cheese-making procedure was carried out. A cheese product was obtained which was of uniformly high quality, suitable moisture, color, pH and acidity.

A portion of the cell paste of this example was stored at refrigerator temperatures (45° F.) for a period of four (4) weeks without significant loss of viability. A further portion of the cell paste was lyophilized to provide a product having about 1,000 times the per gram bacterial population of the paste form, which lyophilized product was stored at refrigerator temperature of about 45° F., for six (6) months, while still retaining its viability.

The preceding examples clearly illustrate a method of preparing the improved bacterial cell paste product for cheesemaking, and the provision of improved cheesemaking methods utilizing such paste. The paste can be prepared rapidly, efficiently and inexpensively. The examples also illustrate that the cell paste has a very high population of bacteria, and can be lyophilized or stored in its cell paste form for long periods of time while retaining its viability. The cell paste reduces over-all costs of transportation and storage of bacterial cultures for cheesemaking.

Because of the uniformity of the cell paste of the present invention, a pre-selected amount of the paste may be added in any particular cheese vat, with the further assurance that the bacteria in the paste are of the desired species. This uniformity of activity and of purity provides a basis for production of consistently high-quality cheese. Various other advantages of the present invention are set forth in the foregoing.

Various of the features of the present invention are set forth in the appended claim.

What is claimed is:

An improved method for the manufacture of Swiss cheese, comprising, in combination, the steps of culturing *Propionibacterium shermanii* bacteria in a nutritive medium, concentrating and separating bacterial cells from the nutritive medium to provide *Propionibacterium shermanii* cell paste, inoculating milk which is to be made into cheese with the *Propionibacterium shermanii* cell paste, and making and curing cheese therefrom.

References Cited in the file of this patent

UNITED STATES PATENTS 2,805,950    Erekson _____ Sept. 10, 1957